United States Patent [19]

Chino et al.

[11] 4,339,367

[45] Jul. 13, 1982

[54] MODIFIED CYCLOPENTADIENE RESINS, PROCESS FOR PREPARING THE SAME, AND A COMPOSITION FOR PRINTING INK CONTAINING SAID MODIFIED RESINS AS VEHICLE COMPONENT

[75] Inventors: Yasuyoshi Chino; Akinori Miyaguchi, both of Yokohama, Japan

[73] Assignee: Nippon Zeon Co., Ltd., Tokyo, Japan

[21] Appl. No.: 217,578

[22] Filed: Dec. 18, 1980

[30] Foreign Application Priority Data

Dec. 21, 1979 [JP] Japan ............................ 54-166699
Feb. 6, 1980 [JP] Japan ............................ 55-13405
Feb. 13, 1980 [JP] Japan ............................ 55-16290

[51] Int. Cl.$^3$ .................. C09D 3/72; C09D 3/733; C09D 11/10
[52] U.S. Cl. ............................ 525/131; 106/27; 106/28; 260/DIG. 38; 526/283
[58] Field of Search ........... 260/23.7 C, DIG. 38; 526/283; 106/27, 28

[56] References Cited

U.S. PATENT DOCUMENTS

| | | | |
|---|---|---|---|
| 3,448,066 | 6/1969 | Parker | 260/23.7 C |
| 3,527,722 | 9/1970 | Carlson et al. | 260/23.7 C |
| 3,778,395 | 12/1973 | Huelsman et al. | 106/27 |
| 3,781,214 | 12/1973 | Nemoto et al. | 106/28 |
| 3,803,109 | 4/1974 | Nemoto et al. | 106/27 |
| 3,937,674 | 2/1976 | Laarkamp | 260/23.7 C |
| 4,028,119 | 6/1977 | Yamada et al. | 106/27 |
| 4,183,833 | 1/1980 | Miyaguchi et al. | 260/23.7 C |
| 4,221,686 | 9/1980 | Sakiyama et al. | 106/27 |
| 4,252,701 | 2/1981 | Miyaguchi et al. | 260/23.7 C |
| 4,256,619 | 3/1981 | Miyaguchi et al. | 260/23.7 C |
| 4,268,427 | 5/1981 | Miyaguchi et al. | 260/23.7 C |

FOREIGN PATENT DOCUMENTS

| | | | |
|---|---|---|---|
| 624303 | 2/1963 | Belgium | 106/27 |
| 1183920 | 12/1964 | Fed. Rep. of Germany | 106/28 |
| 55-21431 | 2/1980 | Japan | 106/27 |

Primary Examiner—Ronald W. Griffin
Attorney, Agent, or Firm—Sherman & Shalloway

[57] ABSTRACT

A process for producing a novel modified resin, which comprises reacting (I) a hydroxyl-containing resin with (II) a polyisocyanate compound, said resin (I) being prepared by reacting (a) the reaction product of a cyclopentadiene resin, a higher fatty acid ester having a conjugated double bond and an $\alpha,\beta$-unsaturated dicarboxylic acid anhydride with (b) a hydroxyl group-imparting agent; a modified resin obtained by the aforesaid process; and a printing ink comprising the modified resin as a vehicle component.

15 Claims, No Drawings

MODIFIED CYCLOPENTADIENE RESINS, PROCESS FOR PREPARING THE SAME, AND A COMPOSITION FOR PRINTING INK CONTAINING SAID MODIFIED RESINS AS VEHICLE COMPONENT

This invention relates to a novel modified resin suitable as a resin for printing inks, a process for production thereof, and a printing ink comprising the modified resin as a vehicle component. More specifically, this invention relates to a novel modified resin derived from a cyclopentadiene resin, a higher fatty acid ester, an $\alpha,\beta$-unsaturated dicarboxylic acid anhydride, a hydroxyl group-imparting agent and a polyisocyanate, a process for production thereof, and a printing ink comprising the modified resin as a vehicle component.

Various methods have been known in the past for the modification of cyclopentadiene resins. They include, for example, a method which comprises cooking a cyclopentadiene resin and a natural drying oil (U.S. Pat. No. 3,084,147), and a method which comprises reacting a cyclopentadiene resin with a higher unsaturated fatty acid in the presence of a metal compound (Japanese Patent Publication No. 2633/75). Modified resins obtained by these methods, however, do not have entirely satisfactory drying properties and pigment wetting properties required of resins for quick drying printing inks, and inks prepared by using these modified resins are not satisfactory in regard to the gloss of a coated film from such inks.

In an attempt to develop resins for inks which are free from the defects of these conventional techniques, the present inventors made extensive investigations, and found that hydroxyl-containing resins obtained by reacting the reaction product of a cyclopentadiene resin, a specified drying oil and an $\alpha,\beta$-unsaturated dicarboxylic acid anhydride, with a hydroxyl group-imparting agent such as a polyhydric alcohol or an alkanolamine to introduce a hydroxyl group thereinto are useful as resins for printing inks (see Japanese Patent Applications Nos. 142945/79 and 8500/80). This method still has the defect that the effect of improving drying property is not entirely sufficient, and ink skinning tends to occur on a roll of a printing press.

It is an object of this invention therefore to provide a process for producing a modified resin which can give an ink having excellent drying property (set) on a paper surface and excellent non-skinning property (the property of not easily skining) on a roll of a printing press.

According to this invention, this object is achieved by a process for producing a modified resin, which comprises reacting (I) a hydroxyl-containing resin obtained by reacting the reaction product of a cyclopentadiene resin, a higher fatty acid ester having a conjugated double bond and an $\alpha,\beta$-unsaturated dicarboxylic acid anhydride, with a hydroxyl group-imparting agent, with (II) a polyisocyanate compound.

In the present invention, a hydroxyl-containing resin synthesized from (a) the reaction product of a cyclopentadiene resin, a higher fatty acid ester having a conjugated double bond and an $\alpha,\beta$-unsaturated dicarboxylic acid anhydride and (b) a hydroxyl group-imparting agent is used as a first component. The reaction product (a) is usually the reaction product derived from 35 to 98% by weight, preferably 50 to 95% by weight of the cyclopentadiene resin, 2 to 65% by weight, preferably 5 to 50% by weight, of the higher fatty acid ester haaving a conjugated double bond, and 0.3 to 30% by weight, preferably 1.0 to 15% by weight, of the unsaturated dicarboxylic acid anhydride. If the amount of the higher fatty acid ester is smaller than the specified limit, the product has inferior pigment wetting property, and if it is larger than the specified limit, gellation tends to take place during the reaction. The unsaturated dicarboxylic acid anhydride serves to improve the pigment wettability of the resulting product further and inhibit formation of a by-product gel. If the amount of the unsaturated dicarboxylic acid anhydride is too large, the color of the product is degraded, and an ink prepared by using the resulting product is liable to cause plate smudging.

The cyclopentadiene resin used in this invention in the synthesis of the reaction product (a) is obtained in a customary manner by heat-polymerizing a cyclopentadiene monomer such as cyclopentadiene, methylcyclopentadiene or dimers, trimers or codimers thereof, or a mixture of the cyclopentadiene monomer with a minor amount of a comonomer copolymerizable therewith. Cyclopentadiene resins having asoftening point of 80° to 200° C., especially 100° to 170° C., and a Gardner color number of not more than 13 suitable.

Specific examples of the comonoer are monolefins such as ethylene, propylene, butene and styrene; conjugated dienes such as 1,3-butadiene, isoprene and 1,3-pentadiene; and polar vinyl monomers such as vinyl acetate, acrylic esters, methacrylic ester, acrylonitrile and allyl alcohol. Homopolymers of cyclopentadiene monomers or copolymers of these with hydrocarbon-type comonomers such as monolefins and conjugated dienes are preferred.

Examples of the higher fatty acid ester are esters formed between monocarboxylic acids having a conjugated double bond in the molecular chain and having at least 12 carbon atoms, such as eleostearic acid and parinaric acid, and monohydric or polyhydric alcohols such as methanol, ethanol, butanol, octanol, ethylene glycol, glycerol, pentaerythritol and trimethylol propane. Of these, triesters of glycerol are preferred. The triglycerides are contained in natural drying oils such as tung oil, dehydrated caster oil, oiticica oil and perilla oil. In the present invention, these natural drying oils are suitable as a source of the higher fatty acid ester.

Specific examples of the $\alpha,\beta$-unsaturated dicarboxylic acid anhydride include maleic anhydride, citraconic anhydride, itaconic anhydride, and alkyl-substituted derivatives of these. Maleic anhydride is preferred in view of its reactivity, quality and cost.

In the synthesis of the reaction product (a), three required ingredients may be reacted as desired, and no particular limitation is imposed on the sequence of reactions. However, to prevent gellation and obtain a high-molecular-weight reaction product, it is preferred first to prepare an adduct of the cyclopentadiene resin with the $\alpha,\beta$-unsaturated dicarboxylic acid anhydride and an adduct of the higher fatty acid ester with the $\alpha,\beta$-unsaturated dicarboxylic acid anhydride, and then react these two adducts. When the cyclopentadiene resin is reacted directly with the higher fatty acid ester without first forming such adducts, gellation of the higher fatty acid ester tends to take place. Hence, in this case, utmost care is required in controlling the reaction.

The reaction of these components is carried out usually at 190° to 300° C. for 30 minutes to 8 hours in an atmosphere of a gas which is inert to the reaction, such as nitrogen or argon. When the reaction product (a) is to be prepared from the aforesaid adducts of the cyclopentadiene resin and the higher fatty acid ester, these adducts may be prepared by separately reacting the cyclopentadiene resin with the $\alpha,\beta$-unsaturated dicarboxylic acid anhydride, and the higher fatty acid ester with the $\alpha,\beta$-unsaturated dicarboxylic acid anhydride, in a customary manner, for example at 150° to 250° C. for 10 minutes to 5 hours; or by simultaneously reacting the cyclopentadiene resin, the higher fatty acid ester and the $\alpha,\beta$-unsaturated dicarboxylic acid anhydride to form these adducts in situ.

The amount of the $\alpha,\beta$-unsaturated dicarboxylic acid anhydride used at this time is preferably at least 0.1 part by weight, usually 0.2 to 30 parts by weight, per 100 parts by weight of each of these components in order to increase the reactivity of the cyclopentadiene resin with the higher fatty acid ester. To obtain a modified resin useful as an ink vehicle components, it is suitable to use the $\alpha,\beta$-unsaturated dicarboxylic acid anhydride in an amount of 0.3 to 15 parts by weight, per 100 parts by weight of each of the cyclpentadiene resin and the higher fatty acid ester.

The reaction is carried out usually in the absence of a diluent. If desired, a diluent may be used. Examples of the diluent are hydrocarbon solvents such as benzene, toluene, xylene, tetralin and mineral oils, and natural oils inert to the reaction, such as linseed oil and soybean oil. As required, a compound of a metal such as titanium, zirconium, tin or lead may be used as a catalyst.

The hydroxyl group-imparting agent (b) to be reacted with the reaction product (a) to obtain the hydroxyl-containing resin (I) may be any compound which has a functional group capable of being bonded to the reaction product (a) and at least one hydroxyl group in the molecule. It may include, for example, polyhydric alcohols, alkanolamines, and hydroxyl-containing vinyl monomers derived from unsaturated monocarboxylic acids. Specific examples of the polyhydric alcohols are low-molecular-weight polyhydric alcohols such as ethylene glycol, propylene glycol, diethylene glycol, dipropylene glycol, butylene glycol, neopentyl glycol, glycerol, trimethylolethane, trimethylolpropane, triethanolamine, pentaerythritol, sorbitol, diglycerol and bis(hydroxymethyl)-benzene; reesinous polyhydric alcohols such as a dicyclopentadiene-allyl alcohol copolymer and a styrene-allyl alcohol copolymer; and oily polyhydric alcohols such as castor oil, polyethylene glycol, and polypropylene glycol. Specific examples of the alkanolamines are monoalkanolamines such as monoethanolamine, monopropanoloamine, monobutanolamine, monopentanolamine, monooctanolamine and monocyclohexanolamine; and dialkanolamines such as diethanolamine, dipropanolamine, dibutanolamine, dipentanolamine, dioctanolamine, and dicyclohexanolamine. Examples of the hydroxyl-containing vinyl monomers are esters of unsaturated monocarboxylic acids with polyhydric alcohols, such as hydroxyethyl acrylate, hydroxypropyl acrylate, hydroxybutyl acrylate, hydroxyhexyl acrylate, hydroxyoctyl acrylate, hydroxyethyl methacrylate, glycerol diacrylate and pentaerythritol triacrylate, and N-alkanolamides of unsaturated monocarboxylic acids, such as N-methylol acrylamide, N-methylol methacrylamide and hydroxyethyl acrylamide.

When the polyhydric alcohol or alkanolamine is used as the hydroxyl group-imparting agent, hydroxyl group introduction is effected by the bonding of the hydroxyl group or amino group in the molecule to the acid anhydride group of the reaction product (a). When the hydroxyl-containing vinyl monomer is used as the hydroxyl group-imparting agent, hydroxyl introduction is effected by the reaction of the vinyl group with the unsaturated bond in the reaction product (a).

Since the reaction mechanism of hydroxyl introduction differs depending upon the type of the hydroxyl group-imparting agent, the conditions for the reaction of the reaction product (a) with the hydroxyl group-imparting agent (b) are selected properly according to the type of the hydroxyl group-imparting agent. For example, the reaction of the reaction product (a) with the polyhydric alcohol or alkanolamine is carried out by heating the two reactants. Usually, the reaction temperature is 80° to 280° C., and the reaction time is 10 minutes to 5 hours. The amount of the polyhydric alcohol or alkanolamine can be varied over a wide range. Usually, the amount of the polyhydric alcohol or alkanolamine corresponds to 0.5 to 5 moles, preferably 1 to 4 moles, per mole of the acid anhydride group in the reaction product (a).

The reaction of the reaction product (a) with the hydroxyl-containing vinyl monomer is carried out in the presence of a radical initiator usually at a temperature of 80° to 280° C. for a period of 10 minutes to 5 hours. The radical initiator may be any compound which generates radicals upon heating. Examples include benzoyl peroxide, lauroyl peroxide, tertiary butyl peroxide, cumene hydroperoxide, tertiary butyl perbenzoate and azobisisobutyronitrile. The radical initiator is used generally in an amount of 0.001 to 0.5 part by weight per part by weight of the vinyl monomer. Furthermore, the reaction may be carried out using a diluent which falls within the same category as those which can be used in the synthesis of the reaction product (a).

The amount of the vinyl monomer used can be varied over a wide range. It is usually 0.5 to 40 parts by weight, preferably 1 to 30 parts by weight, per 100 parts by weight of the reaction product (a).

The hydroxyl-containing resin (I) obtained by reacting the reaction product (a) with the hydroxyl group-imparting agent (b) preferably has a softening point of 40 to 180° C. and a hydroxyl value of 3 to 120.

Examples of the polyisocyanate compound (II) used to react with the hydroxyl-containing resin (I) include aliphatic polyisocyanates such as ethylene diisocyanate ethylidene diisocyanate, propylene diisocyanate, butylene diisocyanate and hexamethylene diisocyanate; alicyclic polyisocyanates such as cyclopentylene diisocyanate and cyclohexylene diisocyanate; aromatic polyisocyanates such as 2,4-tolylene diisocyanate, 2,6-tolylene diisocyanate, diphenylmethane-4,4'-diisocyanate, triphenylmethane-4,4',4''-triisocyanate, 2,2'-diphenylpropane-4,4'-diisocyanate, 3,3'-dimethyldiphenylmethane-4,4'-diisocyanate, m- or p-phenylene diisocyanate and naphthylene diisocyanate; condensation products formed between these polyisocyanates and polyhydric alcohols such as trimethylolpropane, and pentaerythritol; and isocyanate generators capable of generating isocyanates upon heating, which are obtained by reacting these polyisocyanate compounds with such compounds as sodium hydrogen sulfite, aromatic secondary amines, tertiary alcohols, amides, phenols, lactams, heterocyclic compounds and sulfites.

The reaction of the hydroxyl-containing resin (I) with the polyisocyanate compound (II) is carred out usually at 30 to 280° C. for 10 minutes to 5 hours. The amount of the polyisocyanate compound (II) used can be varied over a wide range. Usually, it is 0.05 to 2 equivalents, preferably 0.1 to 1.5 equivalents, per equivalent of the hydroxyl groups in the hydroxyl group-imparting agent (b) used to synthesize the hydroxyl-containing resin (I). The modified resin obtained by reacting the hydroxyl-containing resin (I) with the polyisocyanate compound (II) has greatly improved set and non-skinning property.

The reaction product (a) which is obtained by reacting an adduct of the cyclopentadiene resin and the $\alpha,\beta$-unsaturated dicarboxylic acid anhydride with an adduct of the higher fatty acid ester and the $\alpha,\beta$-unsaturated dicarboxylic acid anhydride is superior to conventional cyclopentadiene resins in regard to pigment wettability, solubility in ink solvents and compatibility with other resins for ink vehicles (see U.S. Pat. No. 4,183,833). When this reaction product (a) is used as a material for the hydroxyl-containing resin (I), there can be obtained a modified resin which has these properties as well and is suitable as a vehicle component of an ink.

The modified resin so obtained usually has a softening point of 40° to 180° C. It is useful in such fields as paints, adhesives and varnishes in which cyclopentadiene resins are generally used, and is also suitable as a vehicle component of printing inks. It is especially useful as a vehicle of fast drying offset inks.

The following Examples illustrate the present invention more specifically. All parts and percentages in these examples are by weight unless otherwise specified.

EXAMPLE 1

One hundred parts of a cyclopentadiene resin having a softening point of 135° C. and a Gardner color number of 4 and obtained by heat-polymerizing cyclopentadiene in the presence of xylene at 260° C. for 4 hours and 50 parts of tung oil were heated at 170° C. The molten mixture was reacted with 4 parts of maleic anhydride at 180° C. for 1 hour. One part of zirconium octenate was added, and the temperature was raised to 240° C. The reaction was carried out at this temperature for 5 hours. Ethylene glycol (1.64 parts) was added to 100 parts of the resulting reaction product, and they were reacted at 160° C. for 1 hour to afford a hydroxyl-containing resin having a softening point of 118° C., an acid value of 16.0 and a hydroxyl value of 12.5.

A predetermined amount of tolylene diisocyanate was reacted with the hydroxyl-containing resin at 140° C. for 1 hour to obtain a modified resin.

One hundred parts of the modified resin and 66.7 parts of a petroleum-type solvent were heated at 180° C. for 20 minutes with stirring to form a dope. A pigment (Phthalocyanine blue, TGR, a product of Dainippon Ink and Chemicals, Inc.) was added so that its content reached 20%. The mixture was kneaded on a three-roll mill to prepare an ink so that its tack reached 10.0. Then, the ink obtained was spread on a coated paper by an RI tester, and its gloss, set and nonskinning property were evaluated. The results are shown in Table 1.

TABLE 1

| Run No. | Control 1-1 | Invention 1-2 | Invention 1-3 | Invention 1-4 | Control 1-5 |
|---|---|---|---|---|---|
| Tolylene diisocyanate (parts) | 0 | 1.1 | 2.3 | 7.0 | Reaction(*1) product |
| Tolylene diisocyanate/ ethylene glycol mole ratio | 0 | 0.25 | 0.5 | 1.5 | — |
| Softening point (°C.) | 118 | 117 | 117 | 119 | 110 |
| Gardner color number | 15 | 16 | 16 | 16 | 16 |

TABLE 1-continued

| Run No. | Control 1-1 | Invention 1-2 | Invention 1-3 | Invention 1-4 | Control 1-5 |
|---|---|---|---|---|---|
| Evaluation of the ink | | | | | |
| Gloss(*2) | A | A | A | A | C |
| Set (minutes)(*3) | 12 | 6 | 6 | 9 | 20 |
| Non-skinning property (hours)(*4) | 5 | >20 | >20 | >20 | 5 |

Note to Table 1
(*1)The reaction product prepared in Example 1 from the cyclopentadiene resin, tung oil and maleic anhydride.
(*2)The ink was spread by using an RI print tester. When the gloss was superior to that of a commercial gloss ink, it was rated "A"; when it was equivalent it was rated "B"; and when it was inferior, it was rated "C".
(*3)Fine paper was superimposed on coated paper on which the ink was spread, and the assembly was pressed with a roll. The time which elapsed until set-off completely disappeared was measured, and defined as the set.
(*4)The ink was spread on a glass plate by a 2.5 mµ applicator, and left to stand. Every predetermined period of time, a finger was pressed against the coated surface, then the time which elapsed until the ink no longer stuck to the finger was measured. The longer this time, the better the non-skinning property of the ink.

The results shown in Table 1 demonstrate that the reaction of the tolylene diisocyanate led to improved ink set and markedly improved non-skinning property.

EXAMPLE 2

A modified resin having a softening point of 121° C. and a Gardner color number of 16 was obtained by performing the same reaction as in Run No. 1-3 of Example 1 except that 0.5 mole, per mole of ethylene glycol, of diphenylmethane-4,4'-diisocyanate was used instead of the tolylene diisocyanate. An ink was prepared in accordance with Example 1 using the modified resin, and evaluated. It showed a gloss of A, a set of 9 minutes and a non-skinning property of more than 20 hours.

EXAMPLE 3

A modified resin having a softening point of 118° C. and a Gardner color number of 16 was prepared in the same way as in Run No. 1-3 of Example 1 except that the amounts of ethylene glycol and tolylene diisocyanate were decreased to 0.82 part and 1.15 parts, respectively. An ink was prepared in accordance with Example 1 by using the modified resin, and evaluated. It showed a glass of A, a set of 9 minutes and a non-skinning property of more than 20 hours.

EXAMPLE 4

A modified resin having a softening point of 142° C. and a Gardner color number of 16 was prepared in the same way as in Example 1 except that 13.0 parts of a hydroxyl-containing cyclopentadiene resin (Quintone-1700, hydroxyl value 230, softening point 100° C., a product of Nippon Zeon Co., Ltd.) was used instead of ethylene glycol, and the amount of the tolylene diisocyanate was changed to 2.3 parts. An ink was prepared in accordance with Example 1 by using the modified resin, and evaluated. It showed a gloss of A, a set of 9 minutes and a non-skinning property of more than 20 hours.

EXAMPLE 5

Monoethanolamine (1.8 parts) was added to 100 parts of the same reaction product (a) as obtained in Example 1 and they were reacted at 140° C. for 1 hour to afford a hydroxyl-containing resin having a softening point of 125° C. an acid value of 3.6 and a hydroxyl value of 11.0. The resin was then reacted with a predetermined amount of tolylene diisocyanate at 140° C. for 1 hour to a form a modified resin.

An ink was prepared in accordance with Example 1 by using the resulting modified resin, and evaluated. The results are shown in Table 2.

TABLE 2

| Run No. | Control 5-1 | Invention 5-2 | Invention 5-3 | Invention 5-4 | Control 5-5 |
|---|---|---|---|---|---|
| Tolylene diisocyanate (parts) | 0 | 1.2 | 2.6 | 7.7 | Reaction(*1) product |
| Tolylene diisocyanate/monoethanolamine mole ratio | 0 | 0.25 | 0.5 | 1.5 | — |
| Softening point (°C.) | 125 | 121 | 123 | 120 | 110 |
| Gardner color number | 15 | 16 | 16 | 16 | 16 |
| Evaluation of the ink | | | | | |
| Gloss(*2) | A | A | A | A | B |
| Set (minutes)(*3) | 13 | 5 | 5 | 9 | 20 |
| Non-skinning property (hours)(*4) | 6 | >20 | >20 | >20 | 5 |

(*1), (*2), (*3) and (*4) are the same as the note to Table 1.

The results shown in Table 2 demonstrate that the reaction of tolylene diisocyanate led to improved ink set and markedly improved non-skinning property.

EXAMPLE 6

A modified resin having a softening point of 123° C. and a Gardner color number of 16 was prepared in the same way as in Run No. 5-3 of Example 5 except that 0.5 mole of diphenylmethane-4,4'-diisocyanate was used per mole of monoethanolamine instead of the tolylene diisocyanate. An ink was prepared as in Example 5 using the resulting modified resin, and evaluated. It showed a gloss of A, a set of 8 minutes and a non-skinning property of more than 20 hours.

EXAMPLE 7

A modified resin having a softening point of 115° C. and a Gardner color number of 16 prepared in the same way as in Run No. 5-3 of Example 5 except that the amounts of monoethanolamine and tolylene diisocyanate were decreased to 0.9 part and 1.3 parts, respectively. An ink was prepared as in Example 5 using the resulting modified resin, and evaluated. It showed a gloss of A, a set of 10 minutes and a non-skinning property of more than 20 hours.

EXAMPLE 8

A modified resin having a softening point of 116° C. and a Gardner color number of 16 was prepared in the same way as in Example 5 except that 3.2 parts of diethanolamine was used instead of monoethanolamine and the amount of tolylene diisocyanate was changed to 2.6 parts. An ink was prepared as in Example 1 by using the resulting resin, and evaluated. It showed a gloss of A, a set of 10 minutes and a non-skinning property of more than 20 hours.

EXAMPLE 9

One hundred parts of the same reaction product (a) as obtained in Example 1 was reacted with 5 parts of hydroxyethyl acrylate and 0.05 part of benzoyl peroxide at 180° C. for 1 hour to afford a hydroxyl-containing resin having a softening point of 120° C. and a hydroxyl value of 26.

One hundred parts of the resulting hydroxyl-containing resin was reacted with a predetermined amount of tolylene diisocyanate at 140° C. for 1 hour to form a modified resin.

An ink was prepared by using this modified resin in the same way as in Example 1, and evaluated. The results are shown in Table 3.

TABLE 3

| Run No. | Control 9-1 | Invention 9-2 | Invention 9-3 | Invention 9-4 | Control 9-5 |
|---|---|---|---|---|---|
| Tolylene diisocyanate (parts) | — | 1.0 | 2.0 | 6.0 | Reaction(*1) product |
| Isocyanate group/hydroxyl group (equivalent ratio) | — | 0.25 | 0.5 | 1.5 | — |
| Properties of the resin | | | | | |
| Softening point (°C.) | 120 | 122 | 125 | 115 | 110 |
| Gardner color number | 16 | 16 | 16 | 16 | 16 |
| Hydroxyl value | 26 | 20 | 14 | — | — |
| Evaluation of the ink | | | | | |
| Gloss(*2) | B | A | A | A | C |
| Set (minutes)(*3) | 9 | 9 | 9 | 9 | 20 |
| Non-skinning property(*5) | C | A | A | A | C |

(*1), (*2) and (*3) Same as in Table 1.
(*5) The ink was spread on a glass plate to a thickness of 1 mil by an applicator, and the drying condition of the coated film was determined by finger touch and evaluated on the following standard.
A: The ink did not dry for more than 24 hours.
B: The ink dried in 12 to 24 hours.
C: The ink dried within 12 hours.

The results demonstrate that when the hydroxyl-containing resin is modified with a polyisocyanate, ink gloss and non-skinning property can be improved over the resin of Run No. 9-1 which merely had a hydroxyl group introduced thereinto, and that when the resin is not modified with the hydroxyl group-imparting agent (hydroxyl-containing vinyl monomer) (Run No. 9-5), ink set, gloss and non-skinning property are inferior.

What we claim is:

1. A process for producing a modified resin, which comprises reacting (I) a hydroxyl-containing resin with (II) a polyisocyanate compound, said resin (I) being prepared by reacting (a) the reaction product of a cyclopentadiene resin, a higher fatty acid ester having a conjugated double bond and an $\alpha,\beta$-unsaturated dicarboxylic acid anhydride with (b) a hydroxyl group-imparting agent.

2. The process of claim 1 wherein the modified resin has a softening point of 40° to 180° C.

3. The process of claim 1 wherein the reaction of the hydroxyl-containing resin (I) with the polyisocyanate compound (II) is carried out such that the equivalent ratio of the isocyanate groups in the polyisocyanate compound (II) to the hydroxyl groups in the hydroxyl-containing resin (I) is from 0.05 to 2.

4. The process of claim 1 wherein the hydroxyl-containing resin (I) has a softening point of 40 to 180° C. and a hydroxyl value of 3 to 120.

5. The process of claim 1 wherein the hydroxyl group-imparting agent is a polyhydric alcohol, an alkanolamine, or a hydroxyl-containing vinyl monomer derived from an unsaturated monocarboxylic acid.

6. The process of claim 1 wherein the reaction product (a) is derived from 35 to 98% by weight of the cyclopentadiene resin, 2 to 65% by weight of the higher fatty acid ester and 0.3 to 30% by weight of the $\alpha,\beta$-unsaturated dicarboxylic acid.

7. A modified resin obtained by the process of any one of claims 1 to 6.

8. A vehicle component composition for printing inks, comprising a modified resin having a softening point of 40 to 180° C., said modified resin being prepared by reacting (I) a hydroxyl-containing resin obtained by reacting the reaction product of 35 to 95% by weight of a cyclopentadiene resin, 2 to 65% by weight of a higher fatty acid ester having a conjugated double bond and 0.3 to 30% by weight of an α,β-unsaturated dicarboxylic acid anhydride, with a polyhydric alcohol, an alkanolamine or a hydroxyl-containing vinyl monomer derived from an unsaturated monocarboxylic acid, with (II) a polyisocyanate compound in such proportions that the equivalent ratio of the isocyanate groups in the compound (II) to the hydroxyl groups in the resin (I) is from 0.05 to 2.

9. In an ink comprising a vehicle component, a pigment and a solvent, the improvement wherein the vehicle component is the composition of claim 8.

10. The vehicle component composition for printing inks according to claim 8 wherein the modified resin is the reaction product of the hydroxyl-containing resin with a polyhydric alcohol.

11. The vehicle component composition for printing inks according to claim 8 wherein the modified resin is the reaction product of the hydroxyl-containing resin with an alkanolamine.

12. The vehicle component composition for printing inks according to claim 11 wherein said alkanolamine is a monoalkanolamine selected from the group consisting of monoethanolamine, monopropanolamine, monobutanolamine, monopetanolamine, monooctanolamine and monocyclohexanolamine; or a dialkanolamine selected from the group consisting of diethanolamine, dipropanolamine, dibutanolamine, dipentanolamine, dioctanolamine, and dicyclohexanolamine.

13. The vehicle component composition for printing inks according to claim 8 wherein the modified resin is the reaction product of the hydroxyl-containing vinyl monomer derived from an unsaturated monocarboxylic acid.

14. The vehicle component composition for printing inks according to claim 13 wherein said hydroxyl-containing vinyl monomer is selected from the group consisting of hydroxyethyl acrylate, hydroxypropyl acrylate, hydroxybutyl acrylate, hydroxyhexyl acrylate, hydroxyoctyl acrylate, hydroxyethyl methacrylate, glycerol diacrylate and pentaerythritol triacrylate.

15. The vehicle component composition for printing inks according to claim 8 wherein said α,β-unsaturated dicarboxylic acid anhydride is selected from the group consisting of maleic anhydride, citraconic anhydride and itaconic anhydride or the alkyl-substituted derivatives thereof.

* * * * *